Aug. 15, 1961     G. JOHNSON     2,995,889

KEY PIN FOR CONNECTING LINK CHAINS

Filed Sept. 19, 1958

INVENTOR.
GRADY JOHNSON

BY

Marechal, Biebel, French & Bugg

ATTORNEYS

United States Patent Office 2,995,889
Patented Aug. 15, 1961

2,995,889
KEY PIN FOR CONNECTING LINK CHAINS
Grady Johnson, 338 Stonemill Road, Dayton 9, Ohio
Filed Sept. 19, 1958, Ser. No. 762,045
3 Claims. (Cl. 59—93)

This application relates to a key-type of lock pin for joining with link chains.

In the use of link chains, of the type for example comprising a plurality of endless generally oval rigid links interlooped to form a continuous chain, it is often desirable to engage the chain with some anchor device or with another chain, or to loop the chain upon itself, forming a loop around some object to be lifted or retained. A typical example of such a use is in connection with a length of link chain used to hold a fence gate closed. In such use the chain is looped around a stationary fench post and around some frame part of the gate, and the loop retained in suitable manner, as by a padlock or the like. Such locks or similar key operated mechanisms may be disadvantageous, since a key operation through combination settings is required to release them, and since even the simplest type of such lock is somewhat expensive.

The present invention provides a simple inexpensive key-type lock pin which may be engaged selectively through any similar loop of a link chain, and which will be retained in the engaged position against accidental dislodging. The lock pin, however, does not require any operating mechanism and may be readily engaged and disengaged by a person having knowledge of its mode of operation. However, it is difficult to operate by persons not having such knowledge or not having sufficient dexterity to manipulate the pin, as in the case of small children.

Accordingly, the primary object of this invention is to provide an improved key pin for engagement with portions of link chain, and which is relatively inexpensive and is easy to operate once knowledge of its mode of operation is obtained.

Another object of the invention is to provide such a lock pin which may be engaged selectively with any one of a plurality of similar links in a link chain, as for the purpose of providing a temporary connection between separate links to define loops of variable dimension from a length of such chain.

Other objects and advantages of the invention will be apparent from the following description, the accompanying drawing and the appended claims.

In the drawing—

Figure 1:
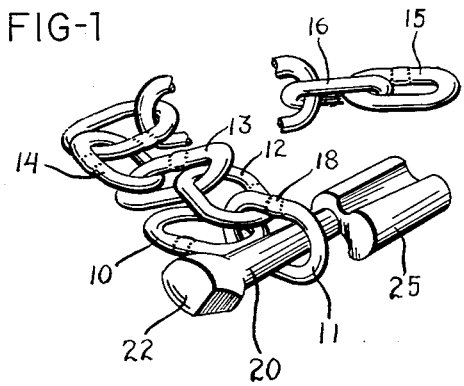
FIG. 1 is a perspective view of a lock pin in accordance with the invention shown engaged with one end of a length of link chain and disengaged with the other end, the chain being broken to facilitate illustration.
Figure 2:
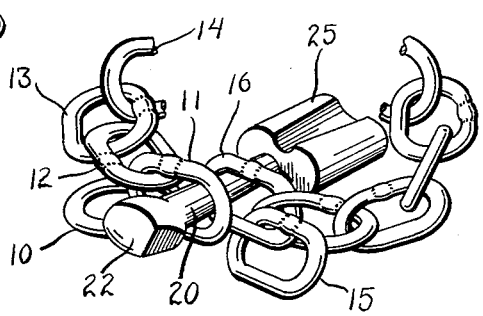
FIG. 2 is a similar perspective view showing the key pin engaged with opposite ends of the length of chain to form a loop.

Referring to the drawing, and particularly to FIG. 1, a length of link chain is shown as including rigid oval shaped links 10, 11, 12, 13 and 14 at one end thereof and links 15 and 16 at the other end of the length of chain.

Each link is of substantially the same generally oval configuration, having predetermined major and minor diameters. The links may be formed by bending appropriate lengths of steel stock or rod of circular cross-section and welding the ends together, as at 18 on link 11, with the links interlooped. Chains of this type, formed from links of various size and dimension, are adapted to a number of uses.

The key-type lock pin provided by this invention is formed as a rigid body, for example of die cast aluminum alloy, including a central neck portion 20 having a reduced cross-section sufficiently smaller than the opening through any one of the links to pass freely therethrough. At one end of the neck there is an integrally formed enlarged head 22 of substantially greater dimension than the neck 20, of such enlargement as to be incapable of passage through any one of the links.

Figure 3:
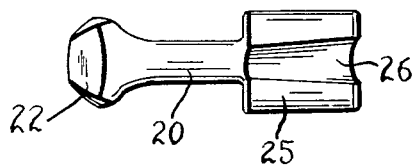
FIG. 3 is a plan view of the top of the key pin.
Figure 7:
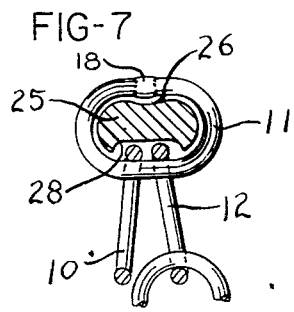
FIG. 7 is a sectional view taken on line 7—7 of FIG. 5.

The other end of neck portion 20 is integrally formed with a key head 25 extending axially therefrom and of cross-sectional peripheral configuration throughout its length substantially complementary to the oval opening defined by each of the links. This relationship is best seen in FIG. 7, wherein it will be noted that the key head 25 includes a shallow slot 26 in the upper surface thereof, preferably tapering inwardly from front to rear as shown in FIG. 3, for passage around any enlargement which may result from the welded joint 18 in the link.

Figure 4:
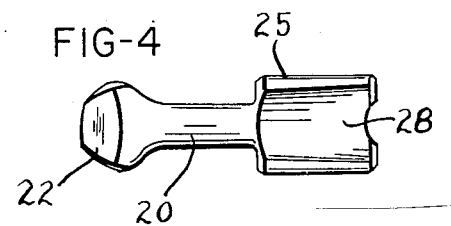
FIG. 4 is a plan view looking at the bottom of the key pin.

In the other or bottom side of the key head there is formed a substantially wider and deeper key slot 28, which also preferably is tapered from a wider opening at the front to a slightly narrower opening at the rear, as shown in FIG. 4. The cross-sectional dimension of slot 28 at its narrowest portion, adjacent the neck 20, is sufficient to provide for passage of two adjacent links which may be interlooped with the link through which the key head is passed. Thus, when the links are properly oriented as shown in FIG. 7 the key head may be inserted through a link with the head passing over parts of adjacent links interlooped with that link through which the key head is inserted. This orientation may be accomplished in any suitable manner, one convenient way being to grasp the link through which the key head is to be inserted and to hold it with its major axis substantially horizontal, such that the adjacent links fall therebeneath, and then inserting the key head of the pin through the grasped link.

Figure 5:
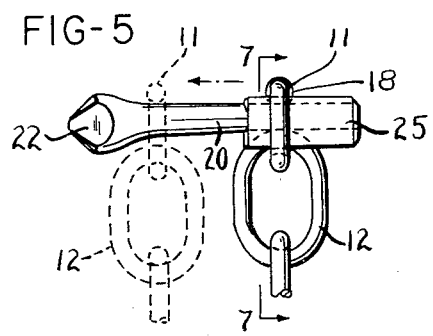
FIGS. 5 and 6 are side elevational views showing the progressive steps in engaging the key pin with links of the chain.
Figure 6:
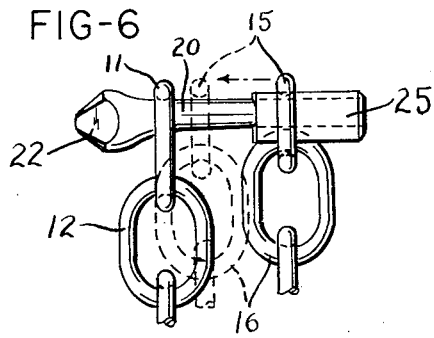

Thus, referring to FIGS. 5 and 6, the link 11 may be so supported and the key head inserted therethrough, the relative motion between the link and the lock pin resulting in positioning of the link 11 as shown in dotted lines in FIG. 5. Subsequently, referring to FIG. 6, with the chain looped about whatever object it may be desired to encircle, the link 15 may be supported as above described and relative movement, as by inserting the key head 25 therethrough, will cause the link 15 to move to the dotted position shown in FIG. 6, whereby the key lock pin will provide a direct temporary connection between the two link members 11 and 15 which are now engaged around neck portion 20. Due to the weight of the individual link members, and due to their non-circular configuration, it is almost impossible for the engaged links to become accidentally dislodged from the key pin. Furthermore, if the link is placed under any tension the adjacent links (for example 10 and 12 in FIG. 7) will be urged apart and thus will not be in proper orientation for passage through slot 28 in the key head. Actual use of key lock pins constructed as above described has proved that it is practically impossible to dislodge or unlock the pin from a link accidentally once it is engaged.

Figure 8:
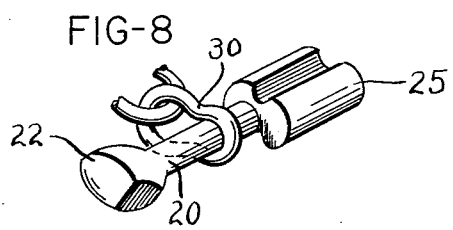
FIG. 8 is a perspective view of a modified form of the invention.

Referring to FIG. 8, in some instances it may be desirable to maintain the lock pin as a part of a length of chain. As shown in that figure this may be done simply by crimping the link 30 to which the key lock pin is to be permanently attached. Thus, this crimping operation will alter the configuration of the opening through the link 30 such that the key head 25 cannot pass therethrough, and the pin will remain attached as shown, although slidable in the link 30 through a distance substantially equal to the length of the neck 20.

Obviously, the above described uses of the invention are not all inclusive. Key lock pins as disclosed herein may be used for example to connect two separate lengths of chain so long as at least one link in each chain will receive and pass the keyhead 25. Furthermore, under some circumstances it might be desirable to anchor the enlarged head 22 to some convenient holding device and use the key pin to provide a temporary anchor connection between a chain and the holding device.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A key pin for locking engagement with an oval substantially rigid link having a central opening and at least one similar link interlooped therewith, comprising a substantially rigid body having a neck of smaller cross-section than the opening for passage therethrough and providing for free relative movement between said body and the link received about said neck, means at one end of said neck dimensioned to prevent passage thereof through the opening, a keyhead enlarged with respect to said neck and extending axially from the other end of said neck and having a peripheral configuration substantially corresponding in size and shape to the opening for passage therethrough only in properly oriented relation, and said key head having a slot in the surface thereof and extending the full length thereof, said slot having an open end adjacent said other end of said neck and having a width and depth sufficient to pass the thickness of an adjacent interlooped link only when said adjacent link is aligned with said slot as said key head is properly oriented with and inserted through the opening, said neck and key head being aligned axially of said key pin such that any portion of the periphery of said neck lies outwardly of the neck axis at a distance no greater than that of the axially adjacent portion of the periphery of said key head, said neck having a maximum transverse dimension substantially less than that of said key head and having a length at least as great as the thickness of two of said links.

2. A key lock pin of the character described adapted for use with a link chain having like generally oval endless links of predetermined thickness and having openings of predetermined major and minor internal diameters, comprising a substantially rigid body including an elongated neck having a length at least as great as the thickness of two of the links and of reduced cross-section, said cross-section being less in maximum dimension than the minor diameter of the opening, a head at one end of said neck sufficiently greater in size than the opening through each link to prevent passage thereof through a link, a key head at the other end of said neck having a cross-section the configuration of which is generally complementary to the opening of a link for passage therethrough only in proper orientation, said key head being so aligned with respect to the longitudinal axis of said neck that no portion of the surface of said neck lies, in a direction transversely of said neck axis, beyond the adjacent portion of said key head, and a slot extending across one surface of said key head substantially parallel to the axis of said neck and having an open end adjacent said other end of said neck providing clearance for passage of said key head over that portion of the next adjoining link looped through the link into which said key head is inserted only when said key head is properly oriented with said link and the portion of the adjacent link is also oriented with said slot.

3. A key lock pin as defined in claim 3 wherein said slot in said key head is of sufficient width to provide for passage of the portions of two adjoining links looped through that link into the opening of which said key head is passed but only when said portions of said two adjoining links are properly oriented with said slot.

References Cited in the file of this patent

UNITED STATES PATENTS

| | | |
|---|---|---|
| 1,314,737 | Everhart | Sept. 2, 1919 |
| 1,314,747 | Hodges | Sept. 2, 1919 |
| 1,530,940 | Herman | Mar. 24, 1925 |
| 1,797,230 | Gillet | Mar. 24, 1931 |
| 2,580,589 | Pfleger et al. | Jan. 1, 1952 |

FOREIGN PATENTS

| | | |
|---|---|---|
| 755,807 | France | Sept. 11, 1933 |

UNITED STATES PATENT OFFICE
CERTIFICATE OF CORRECTION

Patent No. 2,995,889                      August 15, 1961

Grady Johnson

It is hereby certified that error appears in the above numbered patent requiring correction and that the said Letters Patent should read as corrected below.

Column 4, line 12, for "opening" read -- openings --; line 31, for the claim reference numeral "3" read -- 2 --.

Signed and sealed this 12th day of December 1961.

(SEAL)
Attest:

ERNEST W. SWIDER                      DAVID L. LADD
Attesting Officer                      Commissioner of Patents

USCOMM-DC